United States Patent
Gao et al.

(10) Patent No.: US 8,396,166 B2
(45) Date of Patent: Mar. 12, 2013

(54) DETECTION OF SIGNALS CONTAINING SINE-WAVE COMPONENTS THROUGH MEASUREMENT OF THE POWER SPECTRAL DENSITY (PSD) AND CYCLIC SPECTRUM

(75) Inventors: Wen Gao, West Windsor, NJ (US); Hou-Shin Chen, Edison, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 427 days.

(21) Appl. No.: 12/452,112

(22) PCT Filed: Dec. 5, 2007

(86) PCT No.: PCT/US2007/024980
§ 371 (c)(1),
(2), (4) Date: Dec. 15, 2009

(87) PCT Pub. No.: WO2008/153553
PCT Pub. Date: Dec. 18, 2008

(65) Prior Publication Data
US 2010/0134699 A1    Jun. 3, 2010

Related U.S. Application Data

(60) Provisional application No. 60/934,715, filed on Jun. 15, 2007.

(51) Int. Cl.
*H04L 27/00* (2006.01)
(52) U.S. Cl. .................................. 375/316; 375/340
(58) Field of Classification Search .................. 375/316, 375/340, 346, 147, 150
See application file for complete search history.

(56) References Cited

U.S. PATENT DOCUMENTS

| | | | | |
|---|---|---|---|---|
| 5,740,064 A * | 4/1998 | Witte et al. | ...................... | 702/70 |
| 5,859,878 A * | 1/1999 | Phillips et al. | ................ | 375/316 |
| 6,151,354 A * | 11/2000 | Abbey | ........................... | 375/211 |
| 7,065,130 B1 * | 6/2006 | Atarius et al. | ................... | 375/150 |
| 7,640,139 B2 * | 12/2009 | Sahara et al. | .................. | 702/183 |
| 2003/0039319 A1 * | 2/2003 | Engelse et al. | ................. | 375/316 |
| 2003/0054788 A1 * | 3/2003 | Sugar et al. | .................... | 455/323 |
| 2003/0087622 A1 | 5/2003 | Jayaraman et al. | | |
| 2005/0186924 A1 * | 8/2005 | Hur | ............................ | 455/161.1 |
| 2006/0041201 A1 * | 2/2006 | Behbehani et al. | .......... | 600/521 |
| 2007/0100922 A1 | 5/2007 | Ashish | | |
| 2008/0025439 A1 * | 1/2008 | Al-Eidan | ...................... | 375/334 |
| 2008/0250460 A1 * | 10/2008 | Khoini-Poorfard et al. | .... | 725/70 |

(Continued)

FOREIGN PATENT DOCUMENTS

| | | |
|---|---|---|
| JP | 05026921 | 2/1993 |
| JP | 2005269341 | 9/2005 |

OTHER PUBLICATIONS

Nan, et al., "Spectral Correlation Based Signal Detection Method for Spectrum Sensing in IEEE 802.22 WRAN Systems" International conference on Advanced Communication Technology, vol. 8, Feb. 20, 2006, pp. 1765-1770.

(Continued)

*Primary Examiner* — Emmanuel Bayard
(74) *Attorney, Agent, or Firm* — Robert D. Shedd; Joseph J. Opalach

(57) ABSTRACT

A Wireless Regional Area Network (WRAN) receiver comprises a transceiver for communicating with a wireless network over one of a number of channels, and a signal detector for use in forming a supported channel list comprising those ones of the number of channels upon which an Advanced Television Systems Committee (ATSC) DTV (digital television) broadcast signal was not detected. The signal detector performs spectrum sensing as a function of power spectral density (PSD) and cyclic spectrum.

14 Claims, 9 Drawing Sheets

405

U.S. PATENT DOCUMENTS

2009/0153748 A1  6/2009  Gao et al.
2009/0286565 A1  11/2009  Liu et al.

OTHER PUBLICATIONS

Gardner, William A., "Exploration of Spectral Redundancy in Cyclostationary Signals", IEEE SP Magazine, Apr. 1991, pp. 14-36.

Stoica, et al., "Spectral Analysis of Signals", 2005, New Jersey, pp. 22-89.

Gardner, William A., "Measurement of Spectral Correlation", IEEE Transactions on Acoustics, Speech, and Signal Processing, vol. ASSP-34, No. 5, Oct. 1986, pp. 1111-1123.

Mitola, Joseph III, "Cognitive Radio An Integrated Agent Architecture for Software Defined Radio", Dissertation, Doctor of Technology, pp. 1-304, May 8, 2000, Sweden.

European Search Report dated Apr. 28, 2008.

* cited by examiner

*Prior Art*

Table One – TV Channels

| Ch. | Low Edge | Ch. | Low Edge | Ch. | Low Edge |
|---|---|---|---|---|---|
| 2 | 54 | 29 | 560 | 56 | 772 |
| 3 | 60 | 30 | 566 | 57 | 728 |
| 4 | 66 | 31 | 572 | 58 | 734 |
| 5 | 76 | 32 | 578 | 59 | 740 |
| 6 | 82 | 33 | 584 | 60 | 746 |
| 7 | 174 | 34 | 590 | 61 | 752 |
| 8 | 180 | 35 | 596 | 62 | 758 |
| 9 | 186 | 36 | 602 | 63 | 764 |
| 10 | 192 | 37 | 608 | 64 | 770 |
| 11 | 198 | 38 | 614 | 65 | 776 |
| 12 | 204 | 39 | 620 | 66 | 782 |
| 13 | 210 | 40 | 626 | 67 | 788 |
| 14 | 470 | 41 | 632 | 68 | 794 |
| 15 | 476 | 42 | 638 | 69 | 800 |
| 16 | 482 | 43 | 644 | 70 | 806 |
| 17 | 488 | 44 | 650 | 71 | 812 |
| 18 | 494 | 45 | 656 | 72 | 818 |
| 19 | 500 | 46 | 662 | 73 | 824 |
| 20 | 506 | 47 | 668 | 74 | 830 |
| 21 | 512 | 48 | 674 | 75 | 836 |
| 22 | 518 | 49 | 680 | 76 | 842 |
| 23 | 524 | 50 | 686 | 77 | 848 |
| 24 | 530 | 51 | 692 | 78 | 854 |
| 25 | 536 | 52 | 698 | 79 | 860 |
| 26 | 542 | 53 | 704 | 80 | 866 |
| 27 | 548 | 54 | 710 | 81 | 872 |
| 28 | 554 | 55 | 716 | 82 | 878 |
|   |   |   |   | 83 | 884 |

FIG. 1

ATSC 8-VSB Data Segment

*Prior Art*

DETECTION OF SIGNALS CONTAINING SINE-WAVE COMPONENTS THROUGH MEASUREMENT OF THE POWER SPECTRAL DENSITY (PSD) AND CYCLIC SPECTRUM

This application claims the benefit, under 35 U.S.C. §365 of International Application PCT/US2007/24980 and filed May 29, 2008 which was published in accordance with PCT Article 21(2) on Dec. 6, 2007, in English and which claims the benefit of United States Provisional Patent Application No. 60/934,715, filed on Jun. 15, 2007 in English.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

Recently, Cognitive Radio (CR) (e.g., see, J. Mitola III, "Cognitive Radio: An Integrated Agent Architecture for Software Defined Radio," Ph.D. Thesis, Royal Institute of Technology, Sweden, May 2000) has been proposed to implement negotiated, or opportunistic, spectrum sharing to provide a viable solution to the problem of sparsity of the wireless spectrum. To operate CR properly, it is important to perform spectrum sensing, i.e., the ability to detect licensed signals in their assigned spectrum bands. As a result, spectrum sensing becomes one of the core technologies of CR. The most challenging part of performing spectrum sensing is sensing signals in very low signal-to-noise ratio (SNR) conditions.

In this regard, a Wireless Regional Area Network (WRAN) system is being studied in the IEEE 802.22 standard group. The WRAN system is intended to make use of unused television (TV) broadcast channels in the TV spectrum, on a non-interfering basis, to address, as a primary objective, rural and remote areas and low population density underserved markets with performance levels similar to those of broadband access technologies serving urban and suburban areas. In addition, the WRAN system may also be able to scale to serve denser population areas where spectrum is available. Since one goal of the WRAN system is not to interfere with TV broadcasts, a critical procedure is to robustly and accurately sense the licensed TV signals that exist in the area served by the WRAN (the WRAN area). For instance, for sensing the presence of an ATSC DTV (Advanced Television Systems Committee Digital Television) broadcast signal, the miss detection probability should not exceed 0.1 subject to a 0.1 probability of false alarm when the SNR is −20.8 dB.

SUMMARY OF THE INVENTION

In accordance with the principles of the invention, an apparatus performs spectrum sensing by downconverting a received signal; decimating the downconverted received signal; and detecting energy peaks in the decimated signal.

In an illustrative embodiment of the invention, the apparatus is a Wireless Regional Area Network (WRAN) receiver. The WRAN receiver comprises a downconverter for downconverting a received signal for providing a downconverted signal; a decimator for decimating the downconverted signal for providing a decimated signal and a detector, which performs spectrum sensing for incumbent ATSC DTV broadcast signals as a function of a power spectral density (PSD) of the decimated signal.

In another illustrative embodiment of the invention, the apparatus is a Wireless Regional Area Network (WRAN) receiver. The WRAN receiver comprises a downconverter for downconverting a received signal for providing a downconverted signal; a decimator for decimating the downconverted signal for providing a decimated signal and a detector, which performs spectrum sensing for incumbent ATSC DTV broadcast signals as a function of a cyclic spectrum of the decimated signal.

In view of the above, and as will be apparent from reading the detailed description, other embodiments and features are also possible and fall within the principles of the invention.

BRIEF DESCRIPTION OF THE DRAWINGS

FIG. 1 shows Table One, which lists television (TV) channels.

DETAILED DESCRIPTION

Other than the inventive concept, the elements shown in the figures are well known and will not be described in detail. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Further information on ATSC broadcast signals can be found in the following ATSC standards: Digital Television Standard (A/53), Revision C, including Amendment No. 1 and Corrigendum No. 1, Doc. A/53C; and *Recommended Practice: Guide to the Use of the ATSC Digital Television Standard* (A/54). Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)), and receiver components such as a radio-frequency (RF) front-end, or receiver section, such as a low noise block, tuners, and demodulators, correlators, leak integrators and squarers is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

A TV spectrum for the United States is shown in Table One of FIG. 1, which provides a list of TV channels in the very high frequency (VHF) and ultra high frequency (UHF) bands. For each TV channel, the corresponding low edge of the assigned frequency band is shown. For example, TV channel 2 starts at 54 MHz (millions of hertz), TV channel 37 starts at 608 MHz and TV channel 68 starts at 794 MHz, etc. As known in the art, each TV channel, or band, occupies 6 MHz of bandwidth. As such, TV channel 2 covers the frequency spectrum (or range) 54 MHz to 60 MHz, TV channel 37 covers the band from 608 MHz to 614 MHz and TV channel 68 covers the band from 794 MHz to 800 MHz, etc. In the context of this description, a TV broadcast signal is a "wideband" signal. As noted earlier, a WRAN system makes use of unused television (TV) broadcast channels in the TV spectrum. In this regard, the WRAN system performs "channel sensing" to determine which of these TV channels are actually active (or "incumbent") in the WRAN area in order to determine that portion of the TV spectrum that is actually available for use by the WRAN system.

Figure 2:
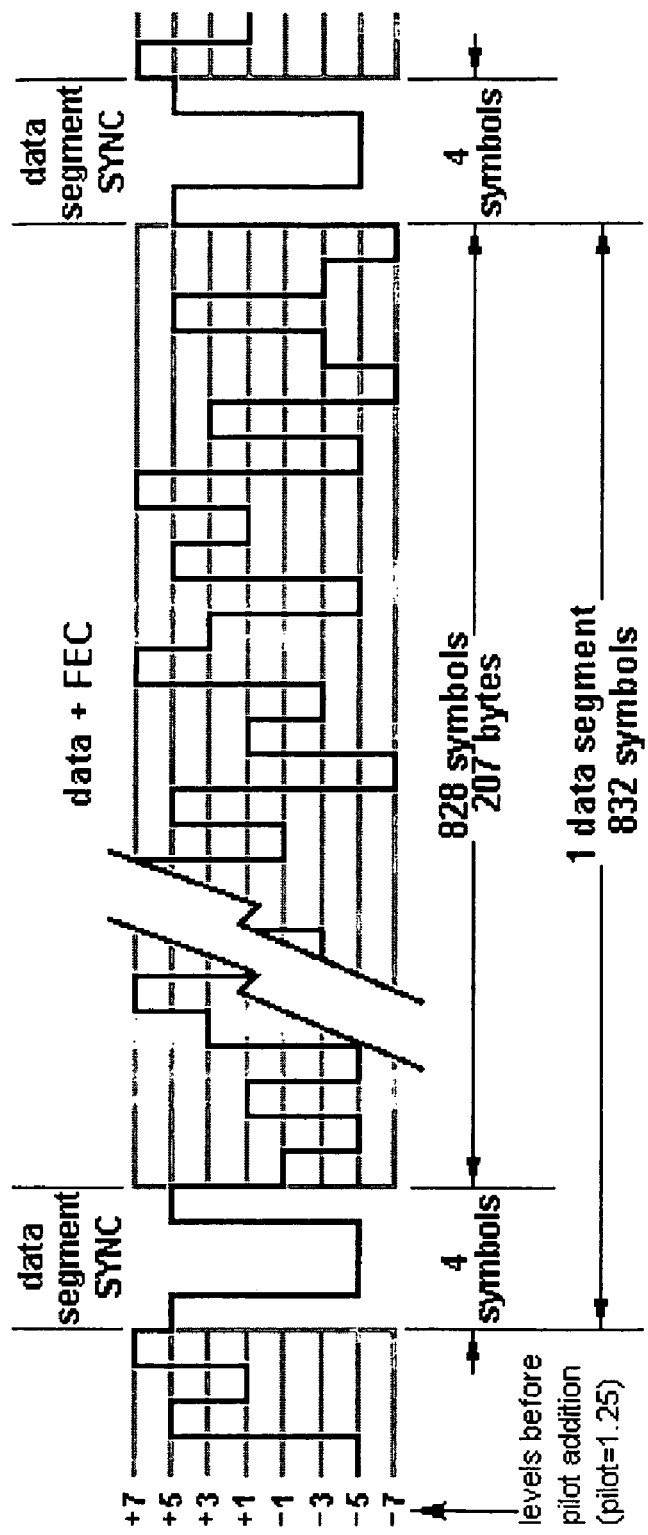
FIGS. 2 and 3 show a format for an ATSC DTV signal.
Figure 3:
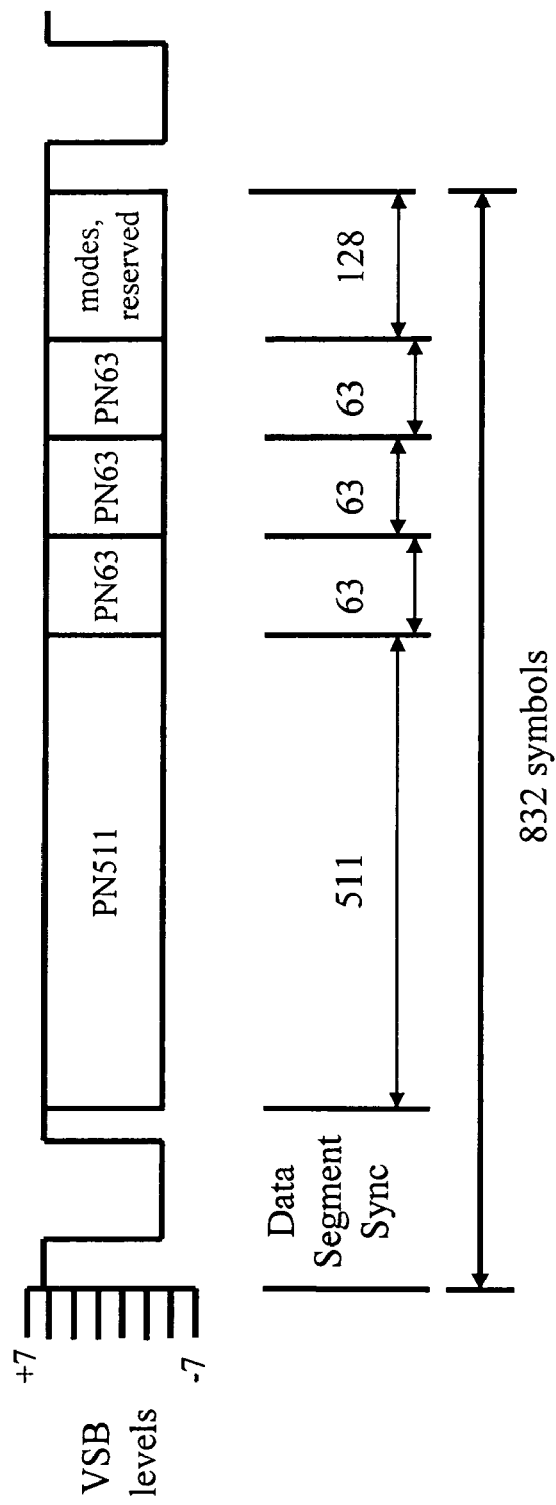

In this example, it is assumed that each TV channel is associated with a corresponding ATSC broadcast signal. The ATSC broadcast signal is also referred to herein as a digital TV (DTV) signal. The format of an ATSC signal is shown in FIGS. 2 and 3. DTV data is modulated using 8-VSB (vestigial sideband) and transmitted in data segments. An ATSC data segment is shown in FIG. 2. The ATSC data segment consists of 832 symbols: four symbols for data segment sync, and 828 data symbols. As can be observed from FIG. 2, the data segment sync is inserted at the beginning of each data segment and is a two-level (binary) four-symbol sequence representing the binary 1001 pattern, which corresponds to [5 −5 −5 5] in terms of 8-VSB symbol. Multiple data segments (313 segments) comprise an ATSC data field, which comprises a total of 260,416 symbols (832×313). The first data segment in a data field is called the field sync segment. The structure of the field sync segment is shown in FIG. 3, where each symbol represents one bit of data (two-level). In the field sync segment, a pseudo-random sequence of 511 bits (PN511) immediately follows the data segment sync. After the PN511 sequence, there are three identical pseudo-random sequences of 63 bits (PN63) concatenated together, with the second PN63 sequence being inverted every other data field.

Figure 4:
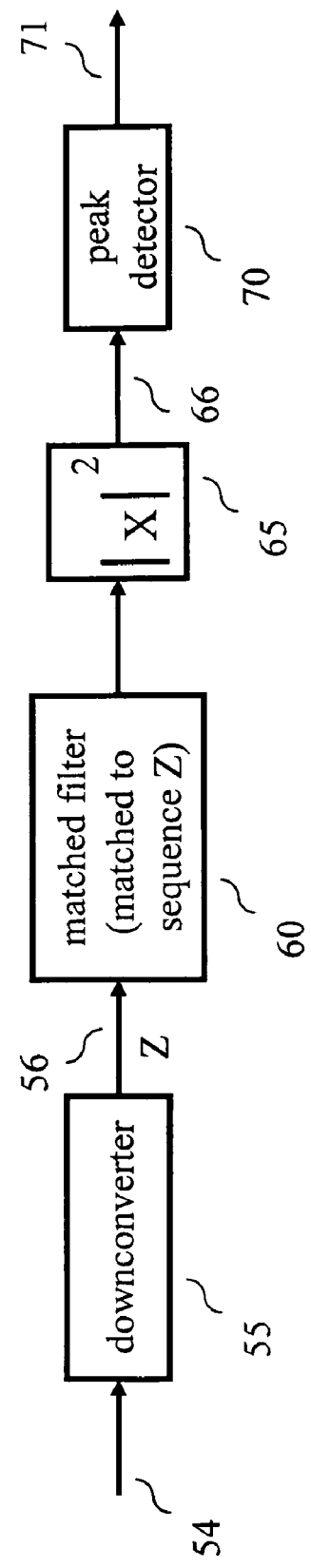
FIG. 4 shows a prior art ATSC field sync detector.

The data segment sync and field sync are representative of signature signals for an ATSC broadcast signal. For example, detection of the data segment sync pattern in a received signal can be used to identify the received signal as an ATSC broadcast signal. As such, in order to improve the accuracy of detecting ATSC broadcast signals in very low signal-to-noise ratio (SNR) environments, data segment sync symbols and field sync symbols embedded within an ATSC DTV signal can be utilized to improve the detection probability, while reducing the false alarm probability. FIG. 4 shows a prior art field sync detector. The field sync detector of FIG. 4 comprises a downconverter 55, a matched filter 60, element 65 and peak detector 70. Downconverter 55 down converts a received signal 54 to baseband in the analog or digital domain (the signal exists as digital samples, for example, at the nominal symbol rate of 10.762 MHz or at two times the symbol rate). The resulting baseband signal, 56, is applied to matched filter 60. The latter is matched to a binary sequence, i.e., the above-mentioned PN511 or PN511 plus PN63 for identifying if the received signal is an ATSC broadcast signal. For example, denote Y0 as the four symbol segment sync sequence, Y1 as the PN511 sequence, Y2 as the PN63 sequence, and Y3 as a sequence with 63 zero valued symbols. Then, denote the sequence Z=[Y0, Y1, Y2, Y3, Y2] as representing the concatenation of these sequences. The reason that Y3 (all zero sequence) is used is because the middle PN63 sequence is inverted every other field. Obviously, other forms of sequence Z can also be used to detect an ATSC DTV signal, such as Z=[Y0, Y1], Z=[Y0, Y1, Y2] or Z=[Y0, Y1, Y3, Y3, Y2], etc. Thus, the matched filer 60 is a filter matched to the binary sequence Z, i.e., the impulse response of the filter is [z(n), z(n−1), . . . , Z(1)] if Z is denoted as [z(1), z(2), . . . , z(n)]. It should be noted that if the sampling rate is twice the symbol rate, the Z sequence will be modified as [z(1), 0, z(2), 0, z(3), . . . , 0, z(n)] where zero-valued symbols are inserted between the symbols in the Z sequence. Following the matched filter 60, the magnitude (65) of the signal is taken (or more easily, the magnitude squared is taken as $I^2+Q^2$, where I and Q are in-phase and quadrature components, respectively, of the signal out of the matched filter 60). This magnitude value (66) is applied to peak detector 70, which determines if an outstanding peak exists. If an outstanding peak exists, then it is assumed that an ATSC broadcast signal is present and peak detector 70 indicates the presence of an ATSC broadcast signal via signal 71.

In contrast to the above-described detector approach, other methods can be used to perform spectrum sensing for incumbent signals. As described below, and in accordance with the principles of the invention, the power spectral density (PSD) of a received signal or the cyclic spectrum of the received signal can be used to perform spectrum sensing for incumbent signals.

The power spectral density (PSD) functions of sinusoidal waves consist of Dirac delta functions, for example, $$e^{j2\pi f_0 t} \leftrightarrow \delta(f - f_0) \quad (1)$$

$$\cos(2\pi f_0 t) \leftrightarrow \frac{1}{4}[\delta(f - f_0) + \delta(f + f_0)]$$

The Dirac delta function has a property that the energy of this function concentrates at one point so that when a signal includes sinusoidal functions, the PSD of the signal contains high-amplitude peaks. Furthermore, for signals which have the same signal energy, sinusoidal waves are more cognoscible because there are significant peaks on their PSD. Thus, for a signal which contains sinusoids, spectrum sensing can be performed by detecting peaks on the PSD of the signal.

Let x(t) be the sum of a finite-strength sine-wave component, with frequency a, and an additive white Gaussian noise (AWGN) w(t), $$x(t)=A \cos(2\pi f_0 t+\theta)+w(t). \quad (2)$$

It is also assumed that w(t) is zero-mean and that the autocorrelation function of w(t) is $$R_w(\tau)=E[w(t)w^*(t-\tau)]=\sigma^2\delta(\tau). \quad (3)$$

Therefore, the PSD of x(t) is $$S_x(f) = \frac{A^2}{4}[\delta(f - f_0) + \delta(f + f_0)] + \sigma^2. \quad (4)$$

Moreover, the cyclic spectrum (e.g., see, W. A. Gardner, "Exploitation of Spectral Redundancy in Cyclostationary Signals," *IEEE Signal Processing Magazine*, Vol. 8, No. 2, pp. 14-36, April 1991 for background information on cyclic spectrum) of x(t) is $$S_x^\alpha(f) = \begin{cases} \frac{A^2}{4}[\delta(f - f_0) + \delta(f + f_0)] + \sigma^2 & \text{for } \alpha = 0 \\ \frac{A^2}{4}e^{\pm j\theta}\delta(f) & \text{for } \alpha = \pm 2f_0 \\ 0 & \text{otherwise} \end{cases} \quad (5)$$

From equation (5), the noise does not contribute to the cyclic spectrum of x(t) when cyclic frequencies a=±2f$_0$ ideally. Thus, and in accordance with the principles of the invention, performing spectrum sensing by detecting the peaks on the cyclic spectrum of a signal may be better than that of using PSD for spectrum sensing.

However, employing either the PSD and the cyclic spectrum of a signal needs an accurate measurement of the spectral components. As mentioned before, the Dirac delta function has a good property that the energy of this function concentrates at a point. However, the frequency resolution (for PSD) or cyclic frequency resolution (for cyclic spectrum) of the measurement method needs to be high enough to resolve the peaks at specific frequencies or cyclic frequencies. It should be noted that the need for high resolution mainly comes from the frequency offset problem due to the mismatch between the oscillator of a transmitter and an oscillator in the corresponding receiver. If there is no frequency offset, then the positions of the delta functions are exactly known and it is easy to measure the spectrum at those frequencies. Information on measurement methods for PSD are described in Chapter 2 of P. Stoica and R. Moss, "Spectral Analysis of Signals," Pearson Prentice Hall, New Jersey, 2005; and information on measurement methods for cyclic spectrum are found in W. A. Gardner, "Measurement of Spectral Correlation," *IEEE Transactions on Acoustics, Speech, and Signal Processing*, Vol. ASSP-34, No. 5, October 1986. These methods can be divided into two categories, one is to reduce random effects by temporal smoothing and the other is by spectral smoothing. For all these methods, the only way to increase frequency resolution is to increase the size of the Discrete Fourier Transform (DFT). However, even with a very large size DFT, one may not be able to resolve the delta functions because they are very sensitive to any frequency mismatch.

To overcome this frequency resolution problem, and in accordance with the principles of the invention, a nearly continuous frequency smoothing method for the measurement of PSD as well as the cyclic spectrum is provided. Let r(t) be the received band-pass signal. Since the carrier frequency is much larger than the signal bandwidth, the received band-pass signal, r(t), can be easily down converted to a lower central frequency $f_{IF}$ without aliasing. Now, let $r_k(t)$ be the down converted signal with central frequency $f_{IF}+kf_\Delta$ where $f_\Delta$ is set to be several hertz. Then, the PSD of the signal r(t) is given by:

$$S_r(t, f) = \frac{1}{2K+1} \frac{1}{\Delta t} \sum_{k=-K}^{K} |X_k(t, f)|^2; \quad (6)$$

and the cyclic spectrum of the signal r(t) is given by:

$$S_r^\alpha(t, f) = \frac{1}{2K+1} \frac{1}{\Delta t} \sum_{k=-K}^{K} X_k(t, f+\alpha/2) \cdot X_k^*(t, f-\alpha/2); \quad (7)$$

where $$X_k(t, f) = \sum_{n=0}^{N-1} r_k(t-nT_s) e^{-j2\pi f(t-nT_s)}; \quad (8)$$

which is the down-converted output of a sliding DFT, and $T_s$ is the time-sampling increment, and N is the number of time samples in the data segment $\Delta t$, which is Fourier transformed by the DFT. Thus, $\Delta t=(N-1)T_s$. It should be noted that the time-sampling increment, $T_s$ may not be the sampling increment used by the analog-to-digital converter in the RF front end and may be changed for complexity issues or other concerns. Here, the parameter $T_s$ represents the time-sampling increment of the signal $r_k(t)$ that is used to perform equations (6), (7), and (8). This method is similar to the spectral smoothing method. However, there is more freedom on the frequency bands used to perform smoothing and—by controlling $f_\Delta$—one has a very high frequency resolution or cyclic frequency resolution. It should be noted that actual implementations may be limited by hardware constraints with regard to the oscillator precision and hardware complexity.

However, if one assumes that spectrum sensing only needs to be concerned with whether the received signal contains a delta function around a period of frequency bands, the complexity of detection can be further reduced by decimation of the signal. Therefore, and in accordance with the principles of the invention, an apparatus performs spectrum sensing by downconverting a received signal; decimating the downconverted received signal; and detecting energy peaks in the decimated signal.

Figure 5:
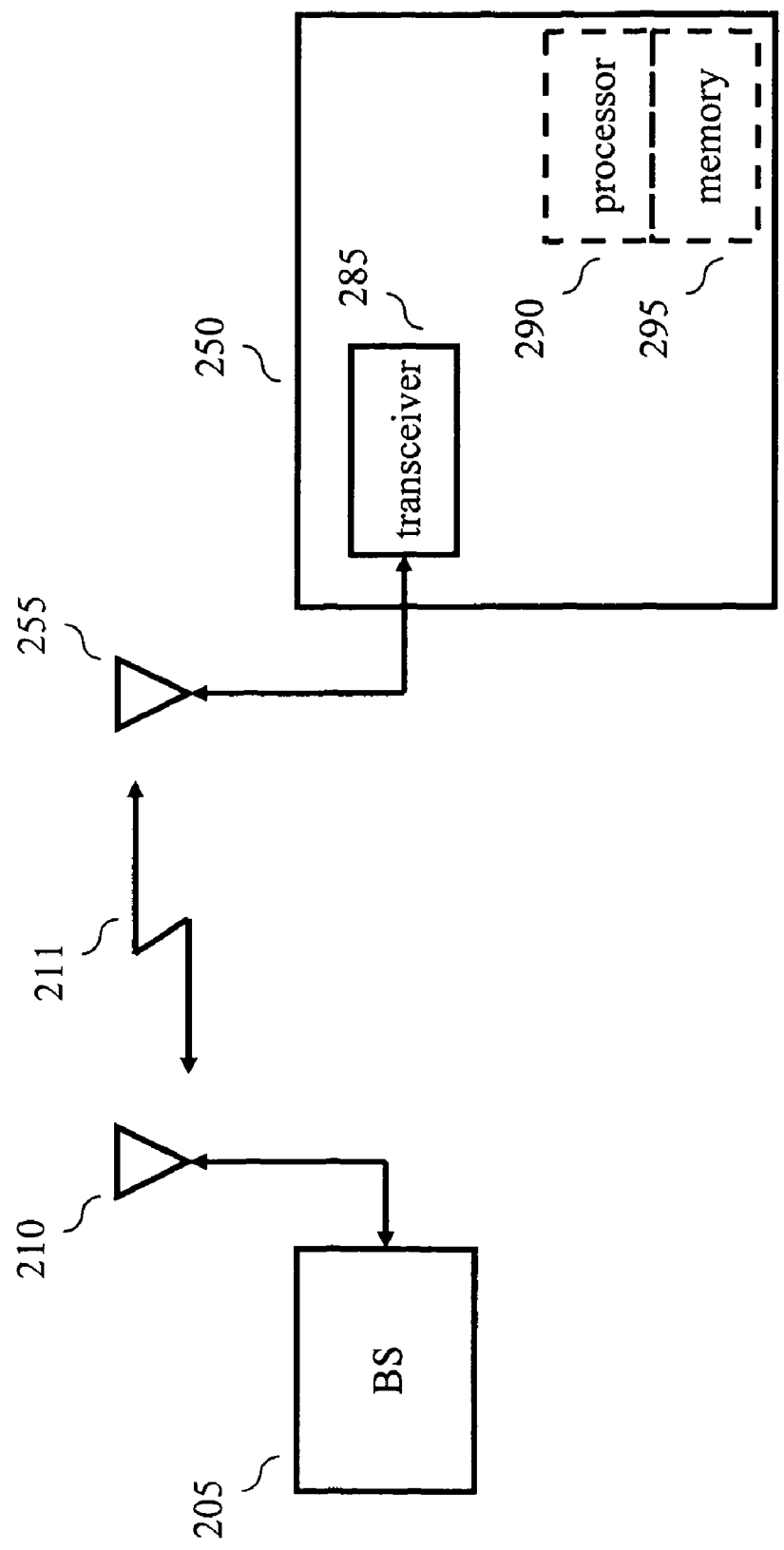
FIG. 5 shows an illustrative WRAN system in accordance with the principles of the invention.

Referring now to FIG. 5, an illustrative Wireless Regional Area Network (WRAN) system 200 incorporating the principles of the invention is shown. WRAN system 200 serves a geographical area (the WRAN area) (not shown in FIG. 5). In general terms, a WRAN system comprises at least one base station (BS) 205 that communicates with one, or more, customer premise equipment (CPE) 250. The latter may be stationary. Both CPE 250 and BS 205 are representative of wireless endpoints. CPE 250 is a processor-based system and includes one, or more, processors and associated memory as represented by processor 290 and memory 295 shown in the form of dashed boxes in FIG. 5. In this context, computer programs, or software, are stored in memory 295 for execution by processor 290. The latter is representative of one, or more, stored-program control processors and these do not have to be dedicated to the transceiver function, e.g., processor 290 may also control other functions of CPE 250. Memory 295 is representative of any storage device, e.g., random-access memory (RAM), read-only memory (ROM), etc.; may be internal and/or external to CPE 250; and is volatile and/or non-volatile as necessary. The physical layer of communication between BS 205 and CPE 250, via antennas 210 and 255, is illustratively OFDM-based via transceiver 285 and is represented by arrows 211. To enter a WRAN network, CPE 250 first attempts to "associate" with BS 205. During this attempt, CPE 250 transmits information, via transceiver 285, on the capability of CPE 250 to BS 205 via a control channel (not shown). The reported capability includes, e.g., minimum and maximum transmission power, and a supported, or available, channel list for transmission and receiving. In this regard, CPE 250 performs "channel sensing" in accordance with the principles of the invention to determine which TV channels are not active in the WRAN area. The resulting available channel list for use in WRAN communications is then provided to BS 205. The latter uses the above-described reported information to decide whether to allow CPE 250 to associate with BS 205.

Figure 6:
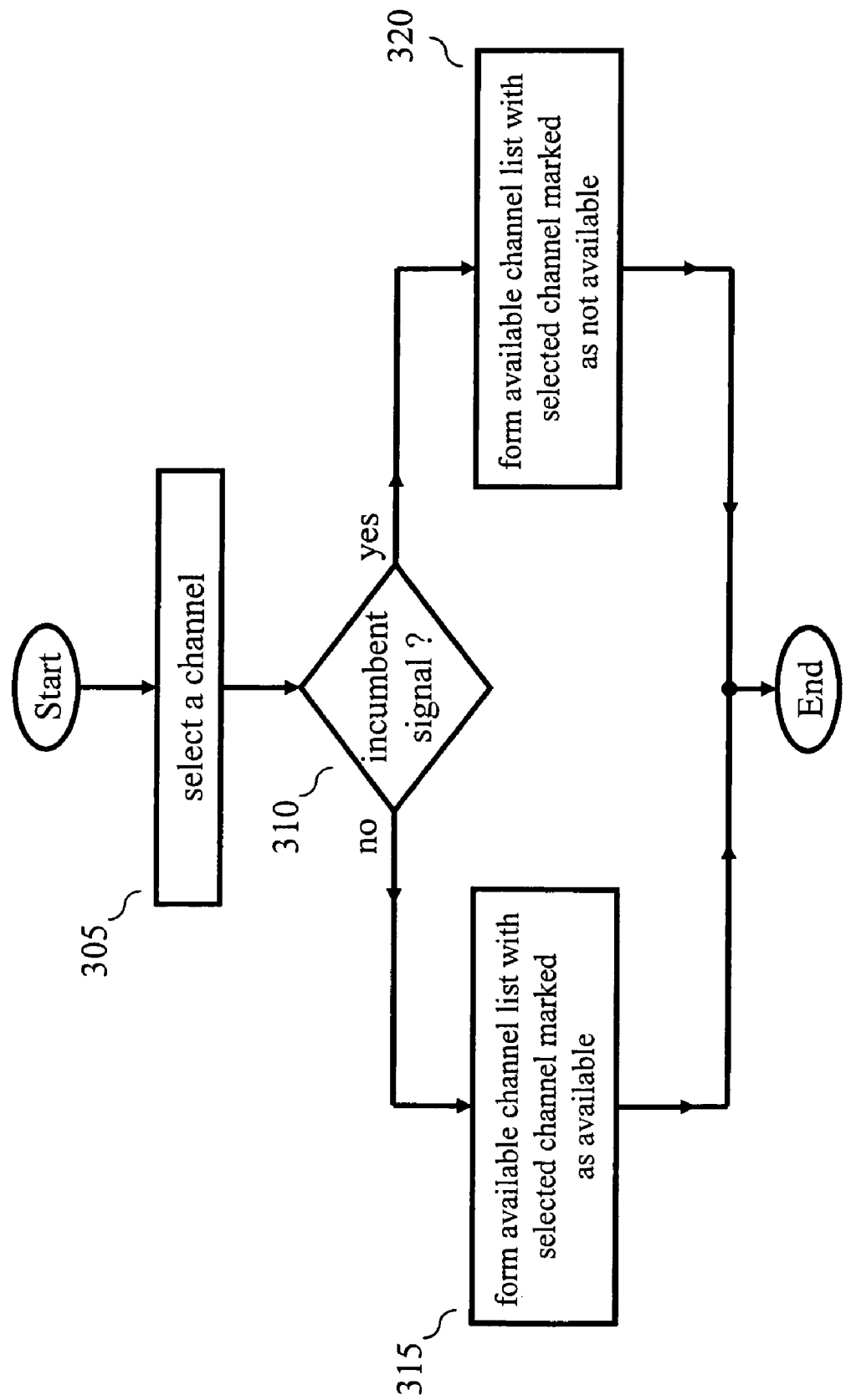
FIGS. 6-7 show illustrative flow charts in accordance with the principles of the invention for use in the WRAN system of FIG. 5.

Turning now to FIG. 6, an illustrative flow chart for use in performing channel sensing in accordance with the principles of the invention is shown. The flow chart of FIG. 6 can be performed by CPE 250 over all of the channels, or only over those channels that CPE 250 has selected for possible use. Preferably, in order to detect incumbent signals in a channel, CPE 250 should cease transmission in that channel during the detection period. In this regard, BS 205 may schedule a quiet interval by sending a control message (not shown) to CPE 250. In step 305, CPE 250 selects a channel. In this example, the channel is assumed to be one of the TV channels shown in Table One of FIG. 1 but the inventive concept is not so limited and applies to other channels having other bandwidths. In step 310, CPE 250 scans the selected channel to check for the existence of an incumbent signal. In particular, CPE 250 performs "spectrum sensing" as a function of power spectral density (PSD) and cyclic spectrum in accordance with the principles of the invention to determine which licensed channels are not active in the WRAN area. Some examples of licensed, or incumbent, signals are DVB-T signals, DVB-H signals and ATSC-DTV signals. If no incumbent signal has been detected, then, in step 315, CPE 250 indicates the selected channel as available for use by the WRAN system on an available channel list (also referred to as a frequency usage map). However, if an incumbent signal is detected, then, in step 320, CPE 250 marks the selected channel as not available for use by the WRAN system. As used herein, a frequency usage map is simply a data structure stored in, e.g., memory 295 of FIG. 1, that identifies one, or more, channels, and parts thereof, as available or not for use in the WRAN system of FIG. 1. It should be noted that marking a channel as available or not can be done in any number of ways. For example, the available channel list may only list those channel that are available, thus effectively indicating other channels as not available. Similarly, the available channel list may only indicate those channels that are not available, thus effectively indicating other channels as available.

Figure 7:
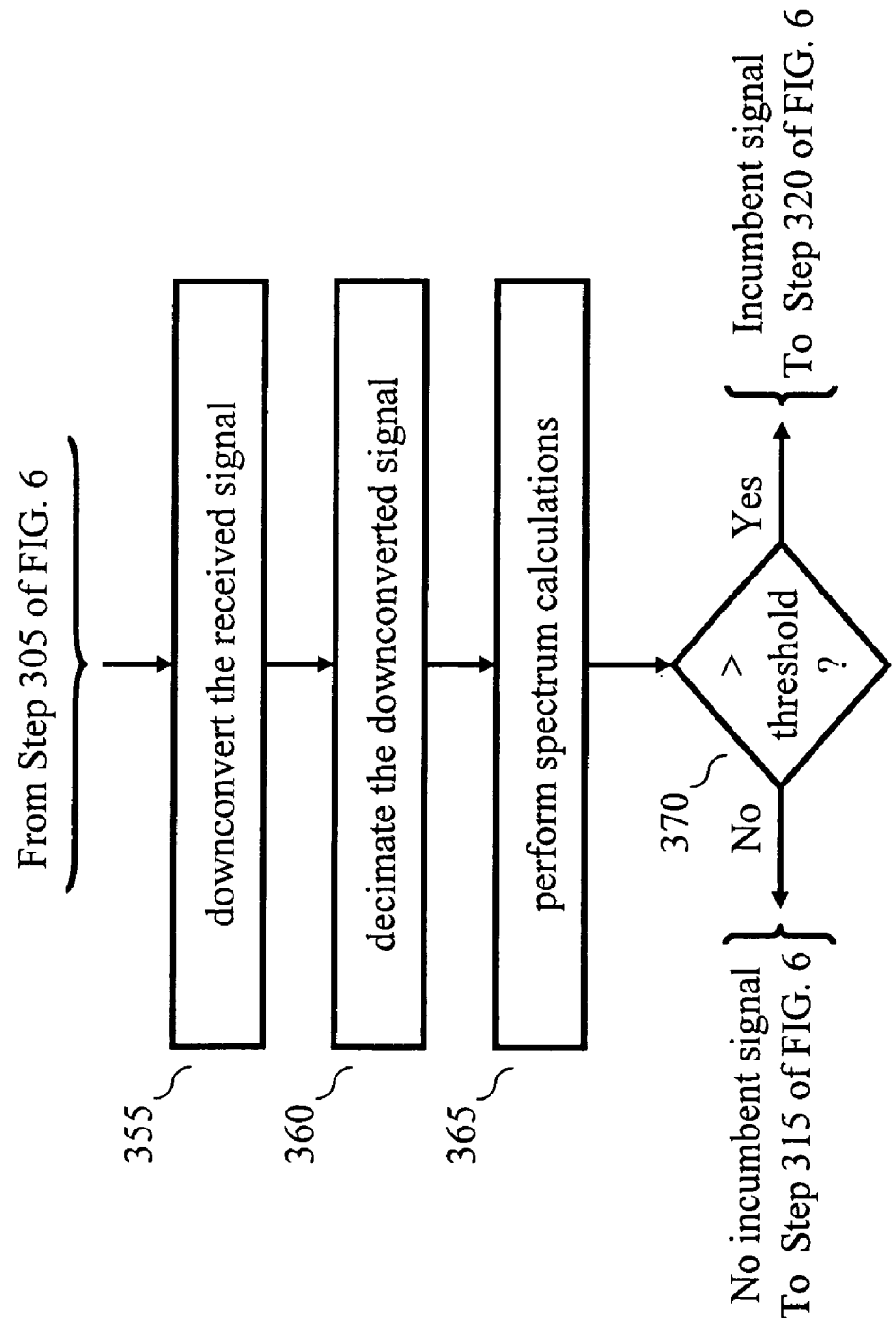

An illustrative flow chart for performing step 310 of FIG. 6 is shown in FIG. 7. In step 355, CPE 250 downconverts the received signal, r(t), on the selected channel to provide a downconverted signal. It should be noted that CPE 250 may also perform low-pass filtering of the downconverted signal. In step 360, CPE 250 decimates the downconverted signal to provide a decimated signal. In step 365, CPE 250 performs spectrum calculations (described further below) on the decimated signal to form a decision statistic, or decision metric, T. In step 370, CPE 250 compares the computed decision metric, T, to a threshold value, which may be determined experimentally. If the threshold value is exceeded, then it is assumed that an ATSC broadcast signal is present. Otherwise, it is assumed that an ATSC broadcast signal is not present.

In the context of the flow chart of FIG. 7, two examples are provided for performing spectrum sensing: the use of PSD and the use of cyclic spectrum.

With regard to a PSD approach, suppose that the PSD of the transmitted signal contains a delta function at frequency $f_0$. In this context, CPE 250, in step 355, downconverts, or shifts the frequency of the received signal, r(t), to provide a downconverted signal having a center frequency $f_{IF}+kf_\Delta$, which may additionally be low-pass filtered. In step 360, CPE 250 decimates or downsamples, the downconverted signal to obtain $r_k(t-nT_s)$. In step 365, CPE 250 uses equations (6) and (8) to compute the PSD associated with the received signal for use in determining the decision metric, T. One example of a decision metric that can be used in step 365 is:

$$T = \max_f S_r(t, f), \quad (9)$$

where the decision metric, T, is the maximum amplitude over all carriers of the estimated PSD. Another example of a decision statistic, T, for use in step 365 is:

$$T = \max_k \max_f |X_k(t, f)|. \quad (10)$$

Finally, in step 370, CPE 250 compares the decision metric, T, to a threshold for determining whether or not an incumbent signal is present.

With regard to a cyclic spectrum approach, a transmitted signal which contains a delta function at frequency $f_0$ of its PSD will have a delta function at frequency 0 of the cyclic frequency $\pm 2f_0$. In this context, CPE 250, in step 355, first filters the received signal, r(t) with a narrow band-pass filter to filter small frequency bands which contains the peaks; and then downconverts, or shifts the frequency of the received signal, r(t), to provide a downconverted signal having a center frequency $f_{IF}+kf_\Delta$. This downconverted signal may be additionally be low-pass filtered. In step 360, CPE 250 decimates or downsamples, the downconverted signal to obtain $r_k(t-nT_s)$. In step 365, CPE 250 uses equations (7) and (8) to compute the cyclic spectrum over different cyclic frequencies a associated with the received signal for use in determining the decision metric, T. One example of a decision metric that can be used in step 365 is to use the maximum amplitude at frequency 0 over all cyclic spectrums as a decision statistic. Finally, in step 370, CPE 250 compares the decision metric, T, to a threshold for determining whether or not an incumbent signal is present.

Figure 8:
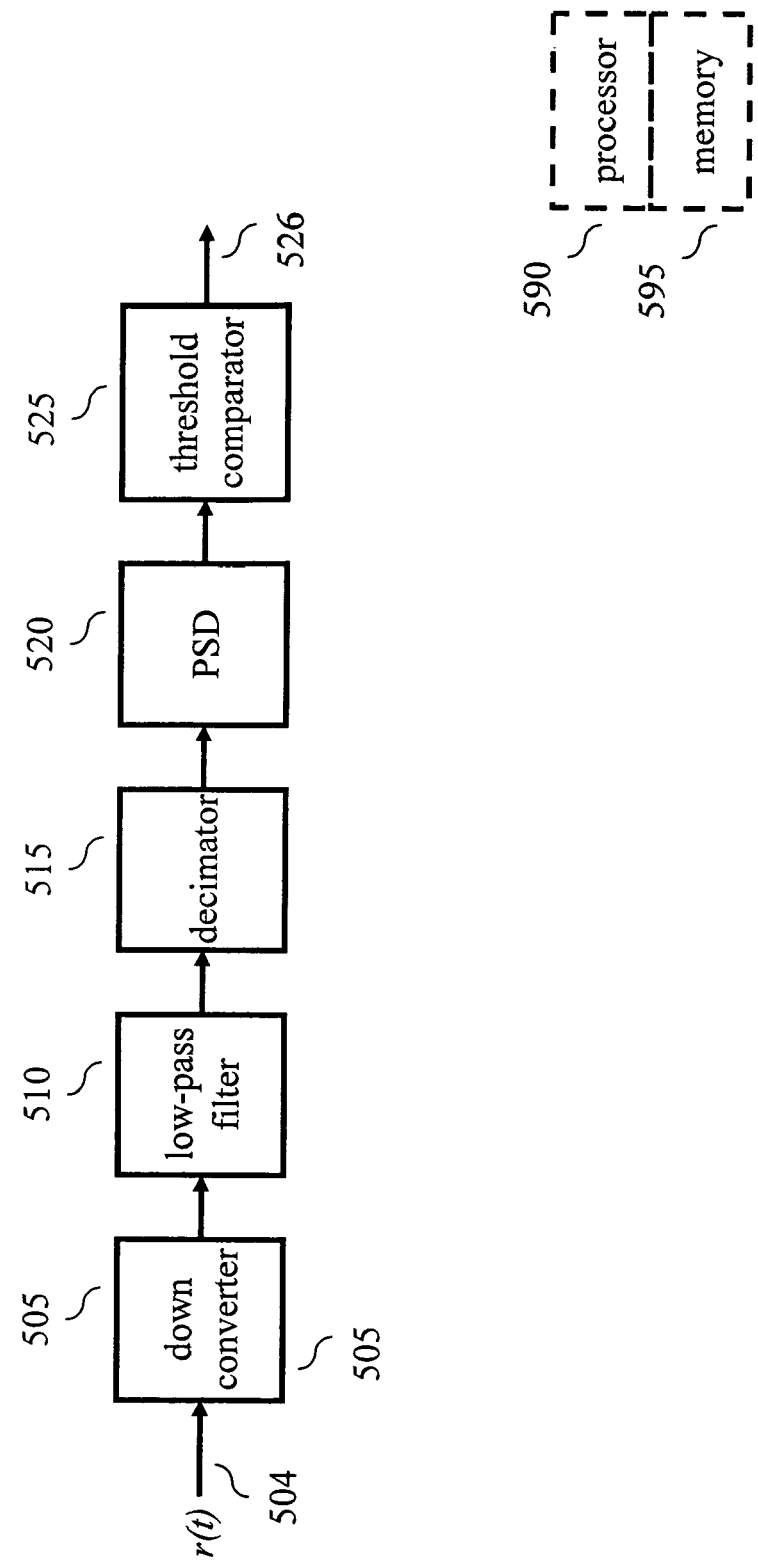
FIGS. 8-9 show illustrative signal detectors in accordance with the principles of the invention.

Turning briefly to FIG. 8, an illustrative portion of a receiver 405 for use in CPE 250 is shown (e.g., as a part of transceiver 285). Only that portion of receiver 405 relevant to the inventive concept is shown. The elements shown in FIG. 8 generally correspond to the description of the steps for the flow chart of FIG. 7 illustrated in the context of using a PSD approach. As such, the elements shown in FIG. 8 can be implemented in hardware, software, or as a combination of hardware and software. In this regard, receiver 405 is a processor-based system and includes one, or more, processors and associated memory as represented by processor 590 and memory 595 shown in the form of dashed boxes in FIG. 8. It should be noted that processor 590 and memory 595 may be in addition to, or the same as, processor 290 and memory 295 of FIG. 5. Receiver 405 comprises downconverter 505, low pass filter 510, decimator 515, PSD element 520 for computing the PSD associated with the received signal and threshold comparator 525. For simplicity, some elements are not shown in FIG. 8, such as an automatic gain control (AGC) element, an analog-to-digital converter (ADC) if the processing is in the digital domain, and additional filtering. Other than the inventive concept, these elements would be readily apparent to one skilled in the art. Further, those skilled in the art would recognize that some of the processing may involve complex signal paths as necessary.

In the context of the above-described flow charts, for each selected channel a received signal 504 may be present, where the carrier frequency, $f_c$, is selected as a function of the currently selected channel (e.g., see FIG. 1). Downconverter 505 downconverts the received signal, r(t), and provides a downconverted signal, via low-pass filter 510, to decimator 515. Decimator 515 decimates the downconverted signal and provides a decimated signal to PSD element 520. PSD element 520 computes the decision metric, T, in accordance with equations (6) and (8) using either equation (9) or equation (10). Threshold comparator 525 compares the decision metric, T, against a threshold value to determine if an incumbent signal is present and provides the results via signal 526 for use by the receiver.

Figure 9:
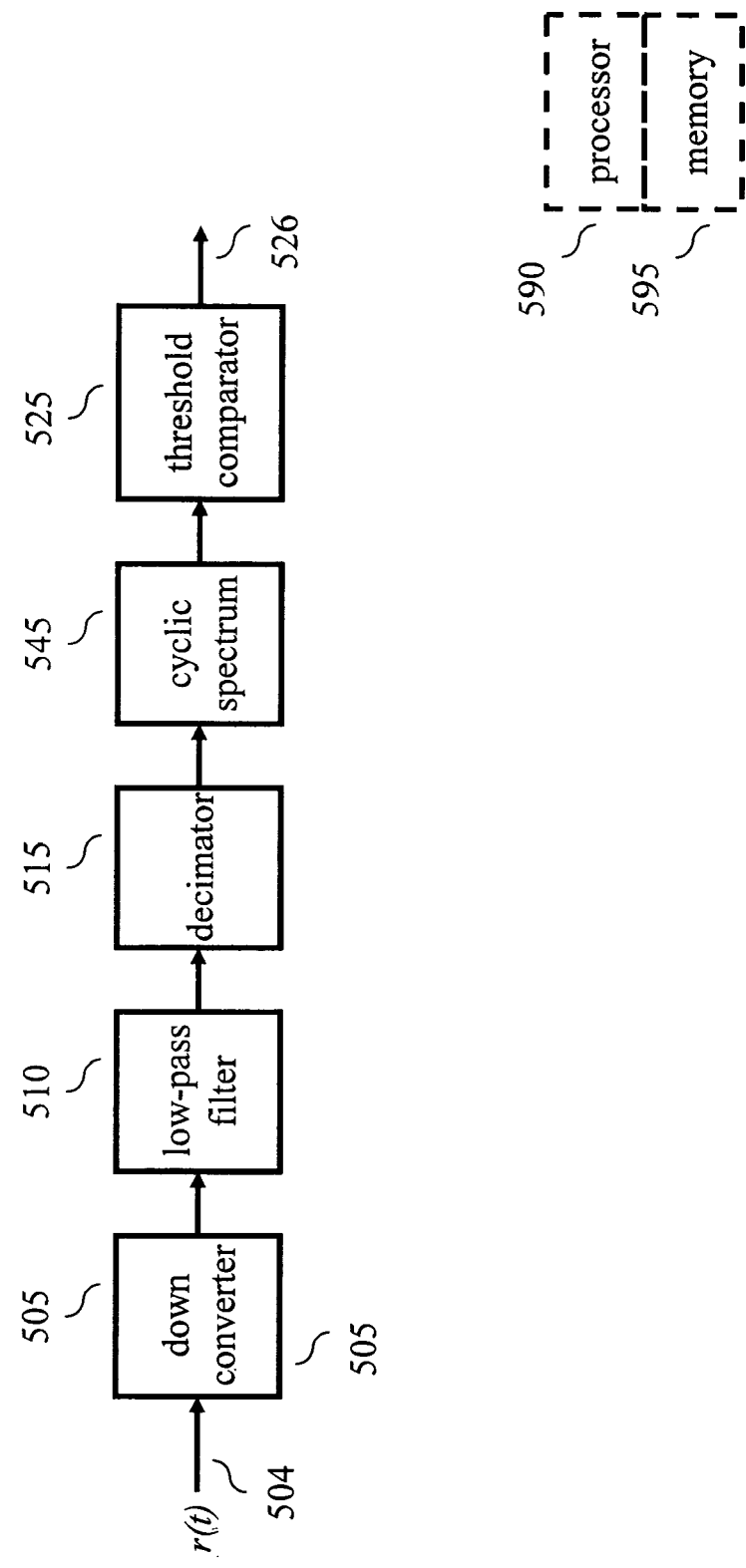

Another variation of a receiver 405 in accordance with the principles of the invention is shown in FIG. 9. This is similar to receiver 405 of FIG. 8 except for the use of cyclic spectrum element 545, which computes the decision metric, T, in accordance with equations (7) and (8) as described above. In this example, threshold comparator 525 compares the decision metric, T, against a threshold value to determine if an incumbent signal is present and provides the results via signal 526 for use by the receiver.

As described above, it is possible to detect the presence of ATSC DTV signals in low signal-to-noise environments with high confidence using either a PSD or a cyclic spectrum approach. However, the inventive concept is not so limited and can also be applied for detecting the presence of any signal. For example, the inventive concept is applicable to detection of OFDM type signals, e.g., such as used in DVB-T (Digital Video Broadcasting-Terrestrial). It should also be noted that although the inventive concept was described in the context of CPE 250 of FIG. 5, the invention is not so limited and also applies to, e.g., a receiver of BS 205 that may perform channel sensing. Further, the inventive concept is not restricted to a WRAN system and may be applied to any receiver that performs channel, or spectrum, sensing.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements (e.g., of FIGS. 5, 8 and 9) may be implemented in a stored-program-controlled processor, e.g., a digital signal processor, which executes associated software, e.g., corresponding to one, or more, of the steps shown in, e.g., FIGS. 6 and 7. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in a wireless endpoint, the method comprising:
   selecting one of a number of channels;
   downconverting a received signal on the selected channel for providing a downconverted signal;
   decimating the downconverted signal for providing a decimated signal; and
   detecting energy peaks in the decimated signal for detecting the presence of an incumbent signal on the selected channel, wherein the detecting step comprises:
   determining a decision metric as a function of a power spectrum density (PSD) or a cyclic spectrum of the decimated signal; and
   comparing the determined decision metric to a threshold value for detecting the presence of the incumbent signal on the selected channel.

2. The method of claim 1, wherein the decision metric is represented by a parameter T, where $$T = \max_f S_r(t, f)$$

and $S_r(t,f)$ represents the PSD of the decimated signal.

3. The method of claim 1, wherein the decision metric is represented by a parameter T, where $$T = \max_k \max_f |X_k(t, f)|$$

and $X_k(t,f)$ represents a Fourier transform of the decimated signal.

4. The method of claim 1, wherein the decision metric is the maximum amplitude at frequency 0 over all cyclic spectrums.

5. The method of claim 1, wherein the incumbent signal is an Advanced Television Systems Committee (ATSC) signal.

6. The method of claim 1, wherein the downconverting step further includes low pass filtering for providing the downconverted signal.

7. The method of claim 1, further comprising the step of:
   marking an available channel list to indicate that the selected channel is available for use if no incumbent signal is present.

8. Apparatus comprising:
   a downconverter for providing a downconverted signal from a selected channel;
   a decimator for decimating the downconverted signal for providing a decimated signal; and
   a processor for detecting energy peaks in the decimated signal for detecting the presence of an incumbent signal on the selected channel, wherein the processor (a) determines a decision metric as a function of a power spectrum density (PSD) or a cyclic spectrum of the decimated signal; and (b) compares the determined decision metric to a threshold value for detecting the presence of the incumbent signal on the selected channel.

9. The apparatus of claim 8, wherein the decision metric is represented by a parameter T, where $$T = \max_f S_r(t, f)$$

and $S_r(t,f)$ represents the PSD of the decimated signal.

10. The apparatus of claim 8, wherein the decision metric is represented by a parameter T, where $$T = \max_k \max_f |X_k(t, f)|$$

and $X_k(t,f)$ represents a Fourier transform of the decimated signal.

11. The apparatus of claim 8, wherein the decision metric is the maximum amplitude at frequency 0 over all cyclic spectrums.

12. The apparatus of claim 8, wherein the incumbent signal is an Advanced Television Systems Committee (ATSC) signal.

13. The apparatus of claim 8, further comprising:
a low pass filter for providing the downconverted signal.

14. The apparatus of claim 8, further comprising:
a memory for storing an available channel list to indicate that the selected channel is available for use if no incumbent signal is present.

* * * * *